United States Patent [19]
Iwamura et al.

[11] Patent Number: 5,445,504
[45] Date of Patent: Aug. 29, 1995

[54] SEALED COMPRESSOR WITH DUST RESERVOIR

[75] Inventors: Shinji Iwamura; Shigeru Muramatsu; Sadayuki Yamada, all of Kusatsu, Japan

[73] Assignee: Matsushita Electric Industrial Co., Ltd., Osaka, Japan

[21] Appl. No.: 116,187

[22] Filed: Sep. 3, 1993

[30] Foreign Application Priority Data

Sep. 4, 1992 [JP] Japan .................................. 4-236798

[51] Int. Cl.⁶ ..................... F01C 21/04; F01M 3/00; F04C 27/00

[52] U.S. Cl. ............................... 417/368; 184/6.18; 418/94; 418/46; 418/55.6

[58] Field of Search .............. 417/410 R, 368; 418/46, 418/55.6, 94; 184/6.16, 6.18, 6.24

[56] References Cited
U.S. PATENT DOCUMENTS

| | | | |
|---|---|---|---|
| 3,830,341 | 8/1974 | Davies et al. | 184/6.16 |
| 4,621,993 | 11/1986 | Nakamura et al. | 418/94 |
| 4,724,928 | 2/1988 | Lewis et al. | 184/6.18 X |
| 4,907,951 | 3/1990 | Wisner | 417/368 X |
| 5,007,808 | 4/1991 | Fraser, Jr. et al. | 184/6.18 |
| 5,168,960 | 12/1992 | DiFlora | 417/368 |

FOREIGN PATENT DOCUMENTS

| | | | |
|---|---|---|---|
| 53-10562 | 3/1978 | Japan . | |
| 1687875 | 10/1991 | U.S.S.R. | 418/46 |

Primary Examiner—Richard A. Bertsch
Assistant Examiner—Ted Kim
Attorney, Agent, or Firm—Pollock, Vande Sande & Priddy

[57] ABSTRACT

A sealed compressor for use in an air conditioner or a refrigerator. The sealed compressor has an electrically driving portion which includes a rotor having a dust reservoir for collecting and storing dust or the like, which reservoir is formed in the central part of the rotor. Further, the dust reservoir is connected to a through hole, in which lubricating oil flows, of a driving shaft through a horizontal hole. Thus, dust contained in lubricating oil are moved outward by centrifugal force. Further, when dust enter the dust reservoir, such dusts are stored therein. Furthermore, the stored dust cannot get out of the dust reservoir. As the result, dust contained in the lubricating oil can be prevented from getting into the sliding portion. Moreover, the sliding portion can be prevented from being damaged by dust contained in the lubricating oil. Consequently, a sealed compressor with high reliability can be provided.

6 Claims, 4 Drawing Sheets

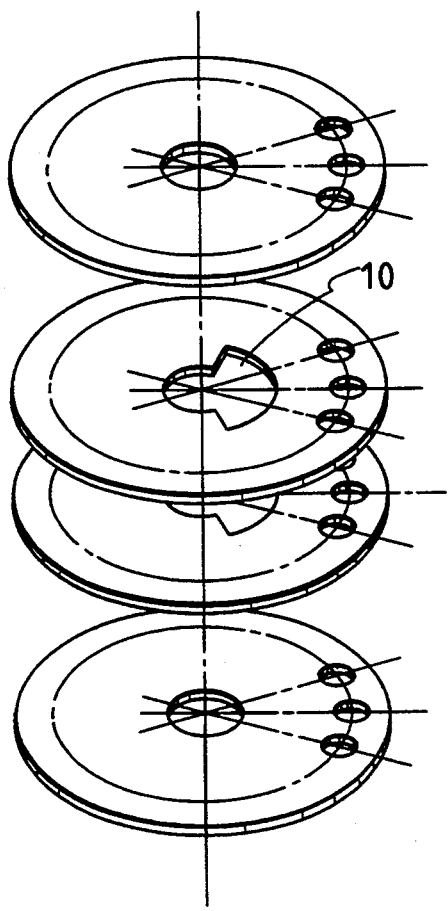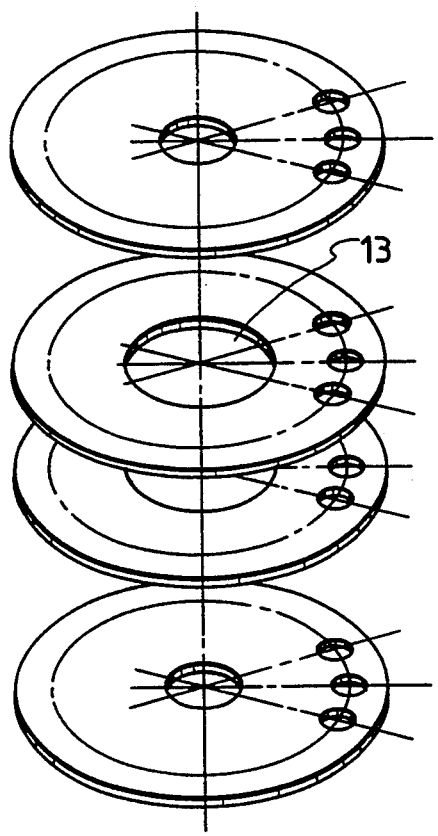

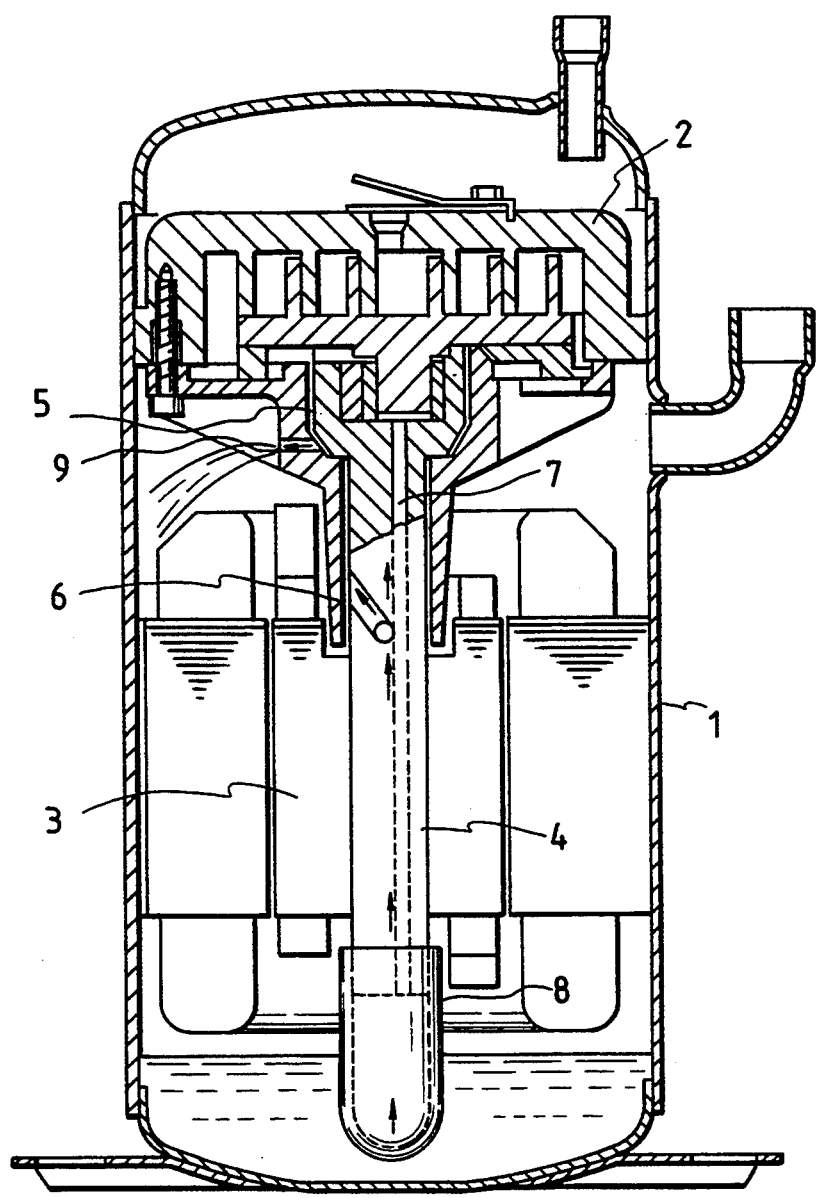

SEALED COMPRESSOR WITH DUST RESERVOIR

BACKGROUND OF THE INVENTION

1. Field of The Invention

This invention relates to a sealed compressor for use in an air conditioner, a refrigerator or the like.

2. Description of The Related Art

Referring first to FIG. 6, there is shown the structure of a conventional sealed compressor. As illustrated in this figure, a compression portion 2 and a an electrically driving portion 3 for driving the compression portion 2 are provided in an upper part and a lower part of a sealed casing 1, respectively. Further, a driving shaft 4 of the compression portion 2 is formed as serving as an output shaft of the electrically driving portion 3. The driving shaft 4 extends in the vertical direction and is rotatably supported by a main bearing 5 and a secondary bearing 6 which are formed on the upper wall and the lower wall of a bearing frame provided in a lower part of the compression portion 2, respectively. Further, an oil pump for supplying lubricating oil to the compression portion 2 is provided at a lower end of the driving shaft 4. In case of the conventional sealed compressor, a through hole 7 is formed in the driving shaft 25 in the longitudinal direction. Moreover, a rotating body 8 is inserted into the through hole 7. Furthermore, lower end portions of the through hole 7 and the rotating body 8 are immersed in lubricating oil stored in an oil basin of a bottom portion of the casing 1. When the driving shaft 4 rotates, the rotating body 8 is rotated. At that time, the lubricating oil is sucked into the through hole 7 by centrifugal force which is caused by this rotation of the rotating body 8. A part of the lubricating oil sucked into the through hole 7 lubricates and cools the secondary bearing 6 and thereafter flows to an oil exhaust port 9. On the other hand, the principal part of the lubricating oil sucked into the through hole 7 flows to the main bearing 5 and joins the lubricating oil coming from the secondary bearing 6. Then, the lubricating oil is exhausted from the oil exhaust port 9 to the upper part of the casing 1. The exhausted lubricating oil is, then, is returned to the oil basin.

The conventional sealed compressor, however, has a drawback in that if the lubricating oil contains dusts or the like, such lubricating oil is fed to a sliding portion extending from the main bearing to the secondary bearing without removing the dusts or the like from the lubricating oil and as the result the sliding portion may be damaged by the dusts or the like contained in the lubricating oil fed thereto.

The present invention is accomplished to eliminate such drawback of the conventional sealed compressor.

It is, therefore, an object of the present invention to raise the reliability of a sealed compressor (namely, to provide a sealed compressor having high reliability).

SUMMARY OF THE INVENTION

To achieve the foregoing object, in accordance with the present invention, there is provided a sealed compressor, the electrically driving portion of which includes a rotor having a notch portion (hereunder sometimes referred to as a dust reservoir) for collecting and storing dust or the like, which portion is formed in the central part of the rotor.

Namely, in a case of the sealed compressor of the present invention, the notch portion is provided on what is called an oil path. Further, dust or the like contained in lubricating oil is moved outward by centrifugal force. Thus, when the dust enters the notch portion, such dust is stored therein. Further, the stored dust or the like cannot get out of the notch portion. As the result, dust or the like contained in the lubricating oil can be prevented from getting into the sliding portion. Moreover, the sliding portion can be prevented from being damaged by dust or the like contained in the lubricating oil. Consequently, the reliability of the sealed compressor can be improved. A sealed compressor with high reliability can be provided.

Incidentally, as will be described later, the dust reservoir can be formed very easily and economically by forming a notch in each rotor core piece of the central part of a rotor core of the electrically driving portion when a laminated rotor core is produced by superimposing rotor cope pieces stamped out by the press.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIGS. 3 and 4 are diagrams each for illustrating how the notch portion (namely, the dust reservoir) is formed at the time of producing the rotor core of the electrically driving portion of the sealed compressor of FIG. 1;

FIG. 6 is a sectional plan view of a conventional sealed compressor.

DETAILED DESCRIPTION OF THE PREFERRED EMBODIMENT

Hereinafter, preferred embodiments of the present invention will be described in detail by referring to the accompanying drawings.

Figure 1:
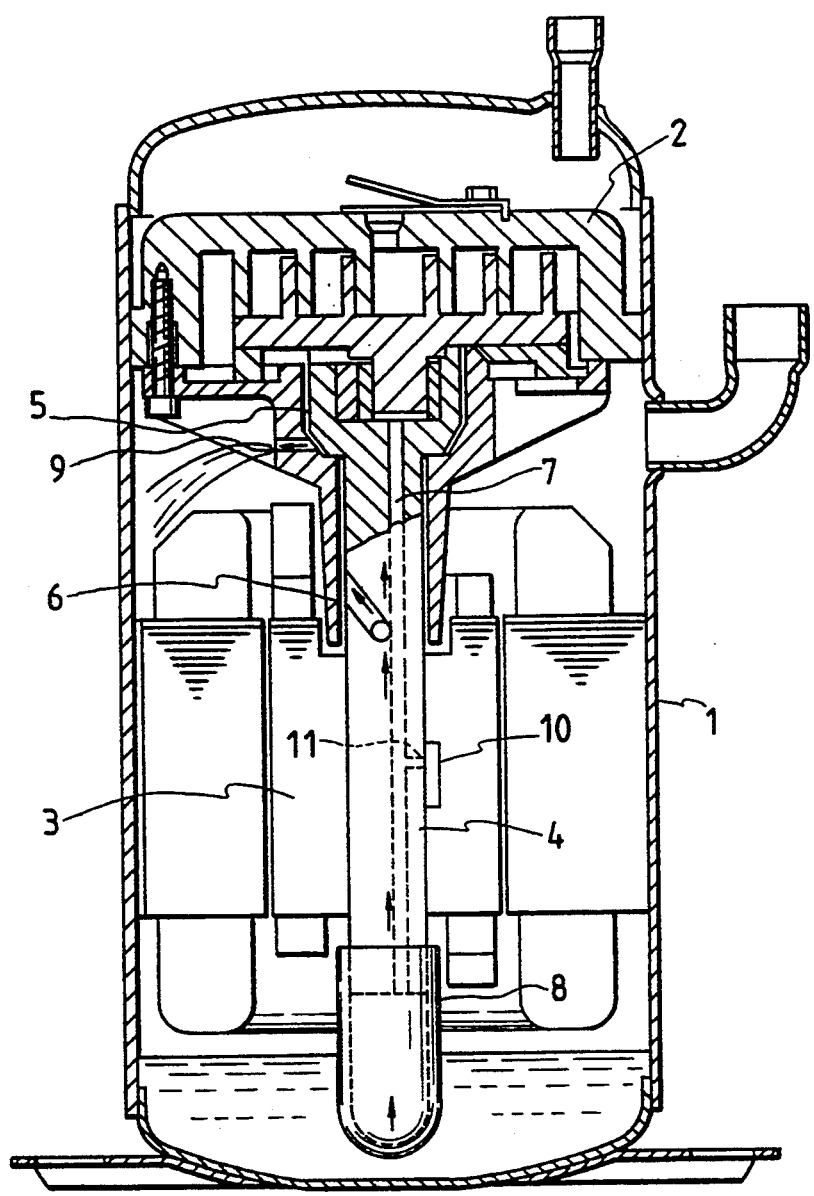
FIG. 1 is a sectional plan view of a sealed compressor embodying the present invention.

FIG. 1 is a sectional plan view of the embodiment of the present invention (namely, a sealed compressor embodying the present invention). In this figure, reference numeral 4 designates a driving shaft for connecting a compression portion 2 to an electrically driving portion 3 which includes an electric motor and for driving the compression portion. As shown in this figure, the driving shaft 4 is provided in a casing 1 to extend in the vertical direction. Further, a through hole 7 is formed in the driving shaft 4 in the longitudinal direction. Moreover, a rotating body 8 is fitted onto the lower end of the driving shaft 4. Furthermore, the lower end portions of the through hole 7 and the rotating body 8 are immersed in lubricating oil stored in an oil basin of a bottom portion of the casing 1. When the driving shaft 4 rotates, the rotating body 8 is rotated. At that time, the lubricating oil is sucked into the through hole 7 by centrifugal force which is caused by this rotation of the rotating body 8. A part of the lubricating oil sucked into the through hole 7 lubricates and cools the secondary bearing 6 and thereafter flows to for an oil exhaust port 9. On the other hand, the principal part of the lubricating oil sucked into the through hole 7 flows to the main bearing 5 and joins the lubricating oil coming from the secondary bearing 6. Then, the lubricating oil is exhausted from the oil exhaust port 9 to the upper part of the casing 1. The exhausted lubricating oil is, then, returned to the oil basin.

Figure 2:
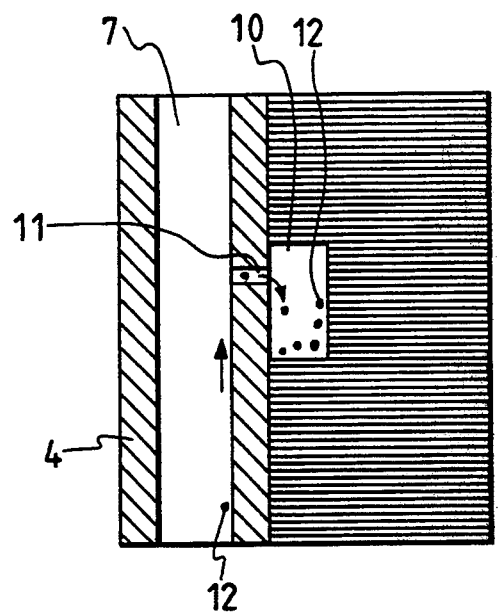
FIG. 2 is a sectional plan view of an example of the notch portion formed in the central portion of the driving shaft of the sealed compressor of FIG. 1.

In a case of this sealed compressor, a notch portion 10 is provided in the central portion of a rotor of the electrically driving portion 3 as shown in FIG. 1. Thereby, dust 12 (indicated by black dots in FIG. 2) contained in the lubricating oil is moved outward by centrifugal force as illustrated in FIG. 2. Moreover, the dust is collected in the notch portion 10 through a horizontal hole 11 and is thus stored in the notch portion, i.e., the dust reservoir 10. During the operation of the electrically driving portion 3, centrifugal force is generated, and the dust 12 held in the notch portion 10 cannot escape and is stored therein. When the sealed compressor is used in a closed cycle, dust which is present in a refrigerating cycle called abrasion powder produced in the sliding portion (i.e., powder-like material removed from the surface of the sliding portion as a result of abrasion), is accumulated in the notch portion 10. Thus the possibility of damaging the sliding portion can be reduced considerably. Further, as shown in FIG. 2., the horizontal hole 11 is bored at the position higher than the center of the side wall of the notch portion 10. Thereby, not only when the sealed compressor operates but also when a foaming phenomenon occurs during the activation of the sealed compressor dust accumulated in the notch portion 10 can be prevented from escaping through an oil passage (namely, the through hole) 7. Moreover, the accumulation capacity of the notch portion 10 can be increased.

Incidentally, the notch portion 10 in the central portion of the driving shaft 4 may be formed by cutting the driving shaft 4. However, as illustrated in FIGS. 8 and 4, the notch portion 10 can be formed very easily by first stamping out a notch in each rotor core piece of the central portion of the rotor core by using a press when a laminated rotor core is produced, and thereafter superimposing on each the rotor core pieces of the rotor core. Further, the notch may be a part of each rotor core piece of the central portion of the rotor core, as illustrated in FIG. 3. The notch portion 10 may be formed by using rotor core pieces, each of which has a larger inside diameter, corresponding to the central portion of the rotor core and also using rotor core pieces, each of which has a smaller inside diameter, corresponding to the other portions of the rotor core, and superimposing such rotor core pieces on each other to form a cylindrical space.

Figure 5:
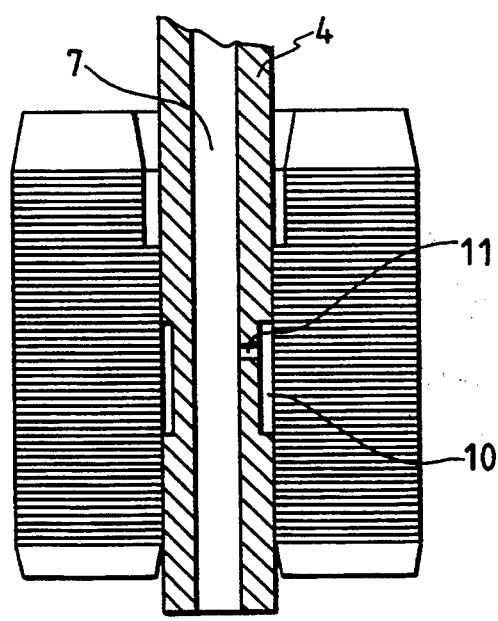
FIG. 5 is a sectional plan view of another example of the notch portion formed in the central portion of the driving shaft of the sealed compressor of FIG. 1.

In the above described example, the notch portion 10 is provided in the central portion of the rotor. However, similar effects can be obtained by forming a notch portion 10 in a crankshaft i.e., the driving shaft 4 as illustrated in FIG. 5. In this example, the action of centrifugal force is small or weak. Further, the accumulation capacity of the notch portion cannot be large. Moreover, a cutting or machining of the driving shaft 4 would be necessary. Therefore, the previous embodiment i.e., in which the notch portion 10 is formed in the rotor, is more favorable.

Incidentally, the present invention is very advantageous when applied to a vertical type scroll compressor.

While the preferred embodiment of the present invention have been described above, it is understood that the present invention is not limited thereto and that other modifications will be apparent to those skilled in the art without departing from the spirit of the invention. The scope of the present invention, therefore, is to be determined solely by the appended claims.

What is claimed is:

1. A sealed compressor comprising:
   a casing which houses an electrically driving portion having a rotor which includes a rotor core, and having a driving shaft which has a through hole bored therein for letting the lubricating oil therethrough;
   a compression portion provided over and driven by the electrically driving portion, and connected to the driving shaft which transmits driving force thereto;
   an oil basin located under the electrically driving portion; and
   a non-annular dust reservoir having a single small opening, located in a central portion of the rotor of the electrically driving portion and connected to the through hole of the driving shaft at the small opening through a thin horizontal hole bored in the driving shaft for receiving dust through the horizontal hole and storing the received dust which is contained in the lubricating oil and moves via the through hole of the driving shaft by centrifugal force.

2. The sealed compressor according to claim 1, wherein the rotor comprises a laminated rotor core containing a plurality of rotor core pieces, each rotor core piece having a notch therein, which form a space for the non-annular dust reservoir to store dust therein.

3. The sealed compressor according to claim 1, wherein the horizontal hole is positioned higher than a center axis of the non-annular dust reservoir, said center axis being perpendicular to the driving shaft.

4. A sealed compressor comprising:
   a casing which houses an electrically driving portion having a rotor which includes a rotor core, and having a driving shaft which has a through hole bored therein for letting the lubricating oil therethrough;
   a compression portion provided over and driven by the electrically driving portion, and connected to the driving shaft which transmits driving force thereto;
   an oil basin located under the electrically driving portion; and
   a non-annular dust reservoir having a single small opening, located in a central portion of the driving shaft of the electrically driving portion and connected to the through hole of the driving shaft at the small opening through a thin horizontal hole bored in the driving shaft for receiving dust through the horizontal hole and storing the received dust which is originally contained in the lubricating oil and is moved via the through hole of the driving shaft by centrifugal force.

5. The sealed compressor according to claim 4, wherein the horizontal hole is positioned higher than a center axis of the non-annular dust reservoir, said center axis being perpendicular to the driving shaft.

6. A sealed compressor comprising:
   a casing which houses an electrically driving portion having a rotor which includes a rotor core, and having a driving shaft which has a through hole bored therein for letting the lubricating oil therethrough;

a compression portion provided over and driven by the electrically driving portion, and connected to the driving shaft which transmits driving force thereto;

an oil basin located under the electrically driving portion; and a dust reservoir having a single small opening, located in a central portion of the rotor of the electrically driving portion and connected to the through hole of the driving shaft at the small opening through a thin horizontal hole bored in the driving shaft for receiving dust through the horizontal hole and storing the received dust which is originally contained in the lubricating oil and is moved via the through hole of the driving shaft by centrifugal force, wherein the rotor of the electrically driving portion comprises a laminated rotor core containing a plurality of rotor core pieces, each rotor core piece having an inside diameter larger than an inside diameter of each rotor core piece of the remaining portion of the rotor core, which form a cylindrical space of the dust reservoir for storing dust therein.

* * * * *